J. L. GIBSON.
FRAMING PROTRACTOR.
APPLICATION FILED MAR. 28, 1916.

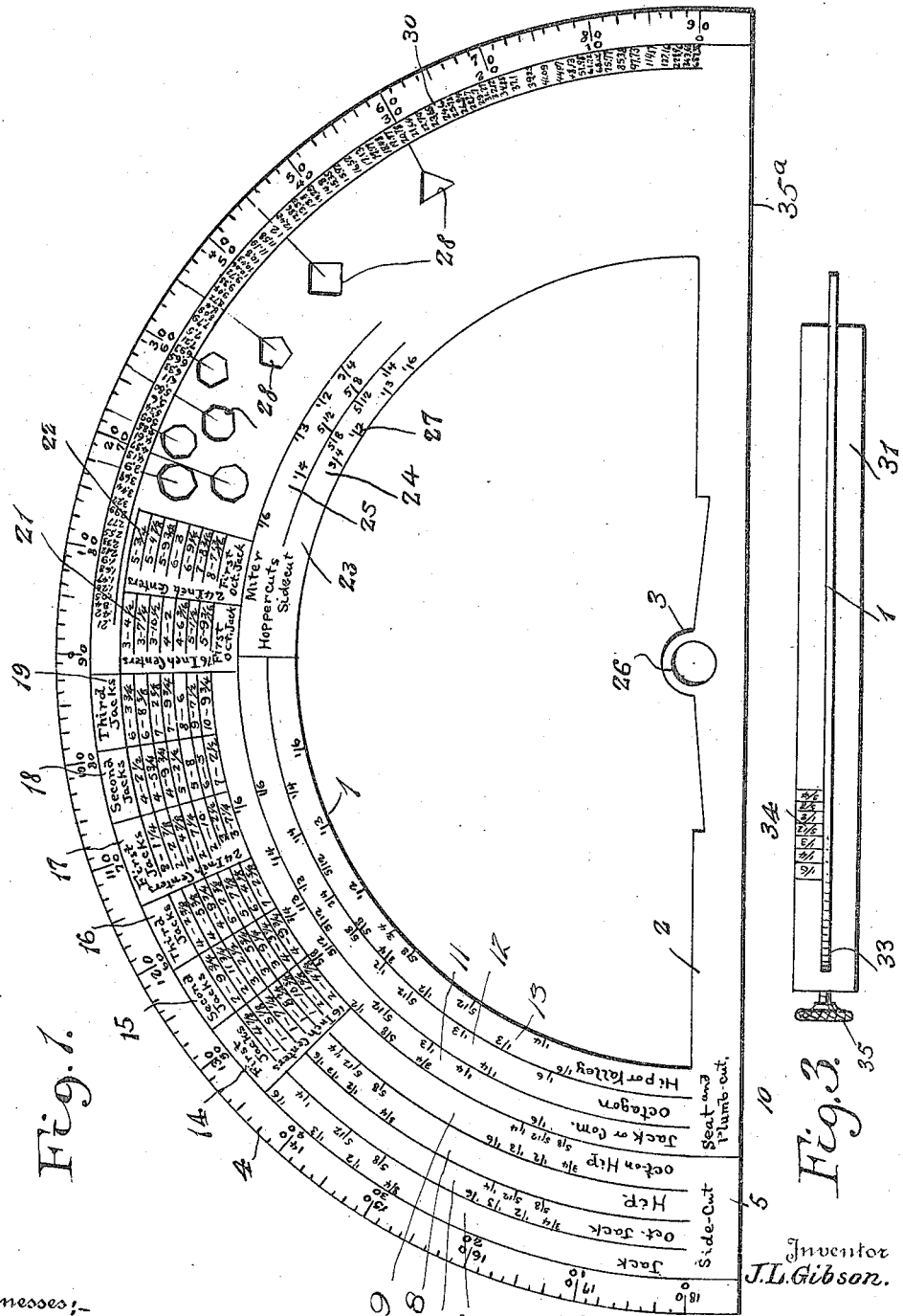

1,264,633.

Patented Apr. 30, 1918.
2 SHEETS—SHEET 2.

Witnesses:

Inventor
J. L. Gibson
By
Attorney

UNITED STATES PATENT OFFICE.

JOSEPH L. GIBSON, OF PORTLAND, OREGON.

FRAMING-PROTRACTOR.

1,264,633.  Specification of Letters Patent.  Patented Apr. 30, 1918.

Application filed March 28, 1916. Serial No. 87,244.

*To all whom it may concern:*

Be it known that I, JOSEPH L. GIBSON, a citizen of the United States, residing at Portland, in the county of Multnomah and State of Oregon, have invented certain new and useful Improvements in Framing-Protractors; and I do hereby declare the following to be a full, clear, and exact description of the invention, such as will enable others skilled in the art to which it appertains to make and use the same.

This invention relates to a framing protractor, and the primary object of the invention is to provide a protractor by means of which the length, rises, pitches, runs, etc., of various rafters used in framing a roof structure may be easily and quickly ascertained without mental and mathematical calculation.

Another object of this invention is to provide a protractor as specified, which includes a substantially semicircular blade or plate, having its ends connected by a cross bar, to the center of which an indicator is pivotally connected, which indicator is mounted upon the blade for movement about the same, and for coaction with various graduations formed upon the plate of the indicator for determining the measurements desired.

With the foregoing and other objects in view, the invention consists in the novel combination and arrangement of parts which will be fully set forth in the following specification and accompanying drawings, in which:

Figure 1 is a face view of the protractor without the indicator connected thereto, Fig. 2 is a rear face view of the protractor, showing the indicator attached thereto, Fig. 3 is an edge view of the protractor, showing one side of the indicator, Fig. 4 is an edge view of the protractor, showing the opposite side of the indicator, and Fig. 5 is a detail view, showing the manner of connecting the indicator to the blade or body of the protractor.

Referring more particularly to the drawings, 1 designates the protractor blade, which is semicircular shaped, and has its ends connected by a bar 2, which is provided with an enlarged head 3 formed centrally of its ends, the center of which ends form the center of the circle on which the plate 1 is scribed.

The front face of the protractor is provided with graduations 4, which are formed adjacent its outer edge and graduated to represent the degrees of a circle from 0 degrees to one hundred and eighty degrees.

The face of the protractor is divided into a plurality of sections, the section 5 of which is in turn divided into a plurality of sections 6, 7, 8 and 9. The section 5 is indicated by the word side cut, and the graduations formed in the various sections 6, 7, 8 and 9 are for determining the side cut of jack, octagon jack, hip and octagon hip rafters, respectively, as clearly shown on the drawings. The section 10 relates to the seat and plumb cuts of the jack or common and hip or valley for square roofs, and octagon for octagon hip roofs. These sub-divisional quotations appear in the section 10 and are designated by the numerals 11, 12 and 13 respectively and are graduated to aid in finding the cuts. By securing the indicator 31 in line with the fraction denoting the desired pitch and placing the protractor on the rafter with the indicator 31 resting on the edge of the rafter, the desired seat and its complement plumb cut as denoted in the same sub-division may be obtained by marking along the edge of the cross bar across the rafter.

The front face of the protractor blade is also divided into compartments 14, 15, 16, 17, 18 and 19. The spaces 14, 15 and 16 are designated first jack, second jack, third jack, respectively, of sixteen inch center, and each of these spaces is divided into a plurality of smaller spaces bearing various numerals relating to different measurements of jack rafters. The spaces 17, 18 and 19 are also indicated first jack, second jack, third jack, and also bear the designation of twenty-four inch center. These spaces may be divided into a plurality of relatively smaller spaces in which are positioned numbers relating to various dimensions of the rafters referred to.

The sections 14, 15, 16, and so on, or the table of jacks may be used for the purpose of obtaining the lengths of jacks or crippled rafters for hip or valley roofs. To ascertain the lengths of the first jack for a sixteenth inch center for one-sixth pitch roof, secure the indicator 31 to the right and contiguous to the section 14 which will place 1-4⅗ in said section in direct alinement with one-sixth on the indicator 31, which means that said jack rafter is one foot four and seven-eighths inches long. The same method is employed for twenty inch centers, and in sections 17, 18, and 19 for hips on square roofs and sections 21 and 22 for octagon jacks on octagon roofs.

Spaces 21 and 22 are also provided, which are divided into a plurality of relatively small spaces bearing numbers which relate to first octagon jack of sixteen inch centers, and first octagon jack of twenty-four inch centers, respectively and the same method is employed as described above for octagon roofs. A space 23 of the face of the plate 1 is divided into spaces 24 and 25, each of which are formed by the scribing line from the center 26 and are indicated by miter and side cuts. The space 23 is indicated by the words "Hopper cut," and these spaces 24 and 25 bear graduations indicated at 27 relating to various dimensions of the miter side cut, as heretofore stated.

It is obvious that the same course as described above may be pursued to obtain the side and miter cuts for hoppers or roof sheathing in valleys or over hip roofs, or ceilings in garrets, as described for getting the angles for seat and plumb cuts. These fractions also relate to the pitch of the roof.

A plurality of polygonal characters, indicated at 28, are formed upon the front face of the plate 1 and they have lines drawn from their centers through lines 29 drawn from their centers through certain of the vertices of the polygon to the degrees of the graduations 4, representing the degrees of the angle of the sides of the polygon. The lines 29, bisect the angles forming the miters of the polygon.

The bisectors, miter, or joint of either of the polygons denoted by the numeral 28 may be found and marked on the timber, molding, or roof plate, by securing the indicator 31 on the line bisecting the polygons.

In a space 30 formed on the front face of the plate 1 are a plurality of numbers representing the inches and fractions and may be used in conjunction with the degrees 4 to find the seat and plumb cut for common rafters for any degree pitch of roof. Example: If the rise is 7.5 (7 and $\frac{6}{12}$ inches) its corresponding degree pitch on the graduations 4, is 32 degrees which would be the seat cut for the common rafter. The complement of 32 degrees is 58 degrees, which would give the plumb cut.

The graduations 4 are provided for framing timbers at any degree of pitch, for instance, if it is desired to frame two pieces of timber at an angle of 110 degrees, it is evident that the miter should stand at half way between the angle or at 55 degrees. The indicator 31 should be secured at 55 degrees and laid against the edge of the timber and the bar 2 across the timber, which will give the cut or miter.

The indicator 31 is pivotally connected to a disk 32 which is mounted centrally in the head 3. The indicator 31 is provided with a longitudinal slot 33, in which the blade 1 is slidably seated. One side of the indicator is provided with a plurality of graduations 34, which indicate the ordinary pitches used on side cuts for jack, octagon jack, hip, octagon hip, and hopper rafters, and seat and plumb cut for jack or common octagon hip or valley rafters, and also the miter cut for hopper rafters.

A thumb screw 35 is carried by the end of the indicator for clamping engagement with the outer edge of the plate 1 for holding the indicator at various adjusted positions about the plate. In using the protractor with graduations heretofore described and formed on the front face of the plate, the indicator is used as a shoulder to place against the timber, and the marks inscribed along the outer straight edge 35$^a$ of the connecting arm 2, after the indicator has been set to determine the miter cut, side cut, seat or plumb cut, as desired. On the back of the blade 1 are a plurality of graduations generically indicated by the numeral 36. The numeral 36$^a$ indicates a series of graduations formed on the lower inner edge on the back of the blade 1 which indicates the length of the run and the numeral 36$^b$ indicates the length of the rafters to be found. The numbers and graduations lying between the graduations 36$^a$ and 36$^b$ and indicated by the numeral 36$^c$ indicate the lengths of the rafters for pitches running from one-sixth pitch up to three-fourths pitch. The graduated run 36$^a$ and lengths 36$^b$ and the graduated lengths between the same 36$^c$ are divided in twelfths and may be employed as or equal to feet, inches, or a fractional part thereof. To find the length of a hip rafter having a three-fourths pitch roof, the run being five feet 9 inches, the indicator 31 will be secured at five and nine-twelfths on the graduated scale 36$^a$ indicating the run, and the length of the rafter would be eleven feet and nine-twelfths inches, as shown at the top of the indicator where the same is marked "H V" meaning hip valley and three-fourths for the pitch of the roof; or, place the indicator 31 at five and eleven twelfths as shown on the drawings and then the length of the rafter for a three-fourths pitched roof would be twelve feet and one inch as shown at the top of the indicator. The side 37 of the indicator 31, which is positioned upon the back side of the plate 1 has spaces 38 formed upon its outer edge, the innermost of which bears the word "Run." The other spaces bear numbers representing the ordinary pitches of rafters. The side of the portion 37 of the indicator is provided with a plurality of spaces 39, the lowermost of which bears the word "Run," the others having the characters representing hip valley, octagon and common placed therein. The spaces 39 are arranged so that three of them equal in length each of the spaces 38 and also are of equal width to the spaces 36. To find the length of a hip, valley, octagon, or common rafter, the indicator is placed at the run desired, which is indicated by the graduations 36, and the pitch of the roof is found on the front face of the indicator and the different rafter lengths of that pitch on the scale of the protractor will coincide with the name of the rafter indicated in the spaces 39, as described above.

From the foregoing description taken in connection with the accompanying drawings the advantages of construction and of the method of operation of the improved framing protractor will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a framing-protractor, a substantially semi-circular body plate, a cross bar connecting the ends of said body plate and having an outer straight edge, an indicator pivotally carried by said cross bar for movement over said plate, the back face of said plate being divided into a plurality of spaces, said spaces being graduated for representing different rafter lengths and graduations carried by said indicator for coaction with said first named graduation, the front face of said plate having a plurality of graduations formed thereon adjacent its outer edge and representing angle degrees of 0° to 180°.

2. In a framing protractor, a substantially semi-circular body plate, a cross bar connecting the ends of said body plate and having an outer straight edge, an indicator pivotally carried by said cross bar for movement of said plate, the front face of said plate having a plurality of graduations formed thereon adjacent its outer edge and representing angle degrees of 0° to 180°, said front face being divided into a plurality of spaces bearing graduations for finding the side cuts, seat and plumb cuts and hopper cuts of framing rafters, and graduations carried by said indicator for coaction with said plate carried graduations.

3. In a framing protractor, a substantially semi-circular body plate, a cross bar connecting the ends of said body plate and having an outer straight edge, an indicator pivotally carried by said cross bar for movement of said plate, the front base of said plate having a plurality of graduations formed thereon adjacent its outer edge and representing angle degrees of 0° to 180°, said front face being divided into a plurality of spaces bearing graduations for finding the side cuts, seat and plumb cuts and hopper cuts of framing rafters and graduations carried by said indicator for coaction with said plate carried graduations and means carried by said indicator for holding the indicator at adjusted positions about said plate.

4. In a framing protractor, a substantially semi-circular body plate, a cross bar connecting the ends of said body plate and having an outer straight edge, an indicator pivotally carried by said cross bar for movement of said plate, the front face of said plate having a plurality of graduations formed thereon adjacent its outer edge and representing angle degrees of 0° to 180°, said front face being divided into a plurality of spaces bearing graduations for finding the side cuts, seat and plumb cuts and hopper cuts of framing rafters and graduations carried by said indicator for coaction with said plate carried graduations, and graduations and characters formed upon the front face of said plate for determining miter cuts of rafters.

5. In a framing protractor, a substantially semi-circular body plate, a cross bar connecting the ends of said body plate and having an outer straight edge, an enlargement formed on the central portion of said cross bar, said enlargement having a circular aperture therein, an indicator for said plate, said indicator being formed in two sections, said sections being adapted to lie on each side of said plate, a circular bearing member carried by the lower portion of one of said members adapted to be rotatably received in said circular aperture, and means for securing the other section to said bearing member and to the body of said member, the front and rear faces of said plate being graduated for representing different rafter lengths and graduations carried by said indicator for coacting with said first named graduations.

In testimony whereof I affix my signature in presence of two witnesses.

JOSEPH L. GIBSON.

Witnesses:
LAURA V. BULKELEY,
H. L. BULKELEY.

Copies of this patent may be obtained for five cents each, by addressing the "Commissioner of Patents, Washington, D. C."